United States Patent
Liu et al.

(10) Patent No.: US 9,213,427 B2
(45) Date of Patent: Dec. 15, 2015

(54) OVER-DRIVE CONTROLLER APPLIED TO A DISPLAY PANEL AND METHOD FOR OVER-DRIVE CONTROL THEREIN

(71) Applicant: Realtek Semiconductor Corp., Hsinchu (TW)

(72) Inventors: Hong-Ta Liu, Taipei (TW); Wen-Hsia Kung, Taoyuan County (TW); Bo-Yun Lin, Chiayi County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 141 days.

(21) Appl. No.: 13/972,970

(22) Filed: Aug. 22, 2013

(65) Prior Publication Data

US 2013/0342515 A1    Dec. 26, 2013

Related U.S. Application Data

(62) Division of application No. 13/045,549, filed on Mar. 11, 2011, now Pat. No. 8,665,194.

(60) Provisional application No. 61/313,104, filed on Mar. 11, 2010.

(51) Int. Cl.
*G09G 3/36* (2006.01)
*G06F 3/038* (2013.01)
*G09G 3/00* (2006.01)

(52) U.S. Cl.
CPC ............... *G06F 3/038* (2013.01); *G09G 3/003* (2013.01); *G09G 3/3611* (2013.01); *G09G 2320/0252* (2013.01); *G09G 2320/0261* (2013.01); *G09G 2320/0285* (2013.01); *G09G 2340/16* (2013.01); *G09G 2354/00* (2013.01)

(58) Field of Classification Search
CPC . G09G 3/2007; G09G 3/3607; G09G 3/3611; G09G 2320/0252; G09G 2320/0261
See application file for complete search history.

(56) References Cited

U.S. PATENT DOCUMENTS

| | | | |
|---|---|---|---|
| 8,199,138 B2 | 6/2012 | Koo et al. | |
| 8,274,461 B2 | 9/2012 | Ha et al. | |
| 2007/0070092 A1* | 3/2007 | Oh et al. | 345/690 |
| 2007/0290964 A1 | 12/2007 | Yang | |
| 2009/0213050 A1 | 8/2009 | Hung | |
| 2011/0261029 A1 | 10/2011 | Moon et al. | |

OTHER PUBLICATIONS

Non-Final Office Action issued from the USPTO for U.S. Appl. No. 13/045,549, dated Aug. 20, 2013.

* cited by examiner

*Primary Examiner* — Regina Liang
(74) *Attorney, Agent, or Firm* — McClure, Qualey & Rodack, LLP

(57) ABSTRACT

An over-drive controller applied to a display panel and a method for over-drive control are provided. The over-drive controller includes an analyzing unit and an over-drive delta value determining unit. The analyzing unit is arranged for analyzing information of a current pixel in order to generate an over-drive information. The over-drive delta value determining unit is coupled to the analyzing unit, and is arranged for determining an over-drive delta value according to the over-drive information. Herein the over-drive information includes a position information or a field information of the current pixel.

4 Claims, 16 Drawing Sheets

OVER-DRIVE CONTROLLER APPLIED TO A DISPLAY PANEL AND METHOD FOR OVER-DRIVE CONTROL THEREIN

CROSS REFERENCE TO RELATED APPLICATIONS

This application is a divisional application of co-pending U.S. application Ser. No. 13/045,549, filed Mar. 11, 2011, which claims the priority of U.S. Provisional Application No. 61/313,104 filed Mar. 11, 2010. The contents of these applications are incorporated herein by reference.

BACKGROUND OF THE INVENTION

1. Field of the Invention

The present disclosure relates to an over-drive controller applied to a display panel, and more particularly, to an over-drive controller for respectively providing a plurality of over-drive delta value tables according to properties of panel blocks of the display panel and a related method for over-drive control.

2. Description of the Prior Art

Level transition time is an important property of the Lucid Crystal Display (LCD) monitor. Generally speaking, a good LCD monitor product prefers as shorter response time as possible. Short response time usually implies the LCD monitor has less residual images and lighter blurred artifacts of the moving pictures. The intrinsic response time of the LCD monitor, however, usually depends on panel fabrication quality and process deviation; and these causes serious variation among different panels. To diminish these unpleasant visual artifacts of the motion pictures, monitor controller design in state of art commonly uses "Over-drive", or so called "Response Time Compensation" technique, to force the level transition speed up. By adjusting the driving voltage, liquid crystals are able to perform the shorter response time, faster transition speed, and achieve the desirable display quality.

Furthermore, in practical LCD monitor applications, fabrication process difference is not the only reason bring about the response time variation. For example, differences must exist between panels if the panels are produced at different fabrication processes, different environments, or different times. Even if the panels are belonging to the same batch and the same model, or even the pixels located on different positions of an identical panel, differences must exist between them. However, current approach for over-drive is mostly implemented by adopting one set of look-up table (LUT) with fixed over-drive delta values, which is called the over-drive delta value table, for a batch of panels. As a result, using only one set of over-drive data may lead to "overshoot" or "undershoot" side effect for a batch of products. Along with the improper over-drive compensation, residual image, blurring effects, over-light, under-light, and even dichromaticism phenomenon distort the display image.

In addition, visual effects of the display panel will be different if the users are under different environmental conditions. For example, the viewing locations where the user is viewing the display panel will affect the relative positions of the objects viewed by the user when the user is viewing a 3D image. For the reasons above, to dynamically adjust the over-drive delta values is required in order to appropriately modify the frames of the display panel.

Hence, how to respectively provide over-drive delta value tables according to properties of panel blocks of the display panel and how to dynamically adjust the over-drive delta values have become an important issue to be solved by designers in this field.

SUMMARY OF THE INVENTION

It is therefore one of the objectives of the present disclosure to provide an over-drive controller for respectively providing a plurality of over-drive delta value tables according to properties of a plurality of panel blocks of a display panel and for dynamically adjusting the over-drive delta values and a related method for over-drive control to solve the above-mentioned problems.

According to one aspect of the present disclosure, an exemplary over-drive controller applied to a display panel is provided. The over-drive controller may include an analyzing unit and an over-drive delta value determining unit. The analyzing unit is arranged for analyzing information of a current pixel in order to generate an over-drive information. The over-drive delta value determining unit is coupled to the analyzing unit, and is arranged for determining an over-drive delta value according to the over-drive information. Herein the over-drive information includes a position information or a field information of the current pixel.

According to another aspect of the present disclosure, an exemplary over-drive controller applied to a display panel is provided. The over-drive controller may include a processor and a storage unit. The storage unit is arranged for storing an over-drive delta value table. The processor is arranged for modifying the over-drive delta value table according to a command of an image signal.

According to still another aspect of the present disclosure, an exemplary over-drive controller applied to a display panel is provided. The over-drive controller may include a receiving unit, an analyzing unit, and an over-drive delta value determining unit. The receiving unit is arranged for receiving a visual angle signal. The analyzing unit is arranged for analyzing the visual signal in order to generate an over-drive information. The over-drive delta value determining unit is coupled to the analyzing unit, and is arranged for determining an over-drive delta value according to the over-drive information. Herein the visual angle signal is related to a viewing location where a user is viewing the display panel.

According to still another aspect of the present disclosure, an exemplary over-drive controller applied to a display panel is provided. The over-drive controller may include an analyzing unit, a storage unit, an adjusting parameter generating unit, and a calculating unit. The analyzing unit is arranged for analyzing information of a current pixel in order to generate an over-drive information. The storage unit is arranged for storing an over-drive delta value table for providing an initial over-drive delta value. The adjusting parameter generating unit is arranged for generating a plurality of adjusting parameters according to the over-drive information. The calculating unit is coupled to the adjusting parameter generating unit and the storage unit, and is arranged for generating the over-drive delta value according to the plurality of adjusting parameters and the initial over-drive delta value to which the current pixel corresponds. Herein the over-drive information comprises a coordinate position of the current pixel.

According to still another aspect of the present disclosure, an exemplary method for over-drive control applied to a display panel is provided. The method may include the following steps: analyzing information of a current pixel in order to generate an over-drive information; and determining an over-drive delta value according to the over-drive information;

wherein the over-drive information comprises a position information or a field information of the current pixel.

According to still another aspect of the present disclosure, an exemplary method for over-drive control applied to a display panel is provided. The method may include the following steps: analyzing a current pixel in order to generate an over-drive information; generating a plurality of adjusting parameters according to the over-drive information; providing an over-drive delta value table corresponding to the current pixel according to an over-drive delta value table; and generating the over-drive delta value according to the plurality of adjusting parameters and the initial over-drive delta value; wherein the over-drive information comprises a coordinate position of the current pixel.

According to still another aspect of the present disclosure, an exemplary method for over-drive control applied to a display panel is provided. The method may include the following steps: providing an over-drive delta value table; and modifying the over-drive delta value table according to a command of an image signal.

According to still another aspect of the present disclosure, an exemplary method for over-drive control applied to a display panel is provided. The method may include the following steps: providing a plurality of over-drive delta value tables; receiving a visual angle signal; analyzing the visual angle signal in order to generate an over-drive information; and selecting one of the plurality of over-drive delta value tables in order to determine an over-drive delta value according to the over-drive information; wherein the visual angle signal is related to a viewing location where a user is viewing the display panel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
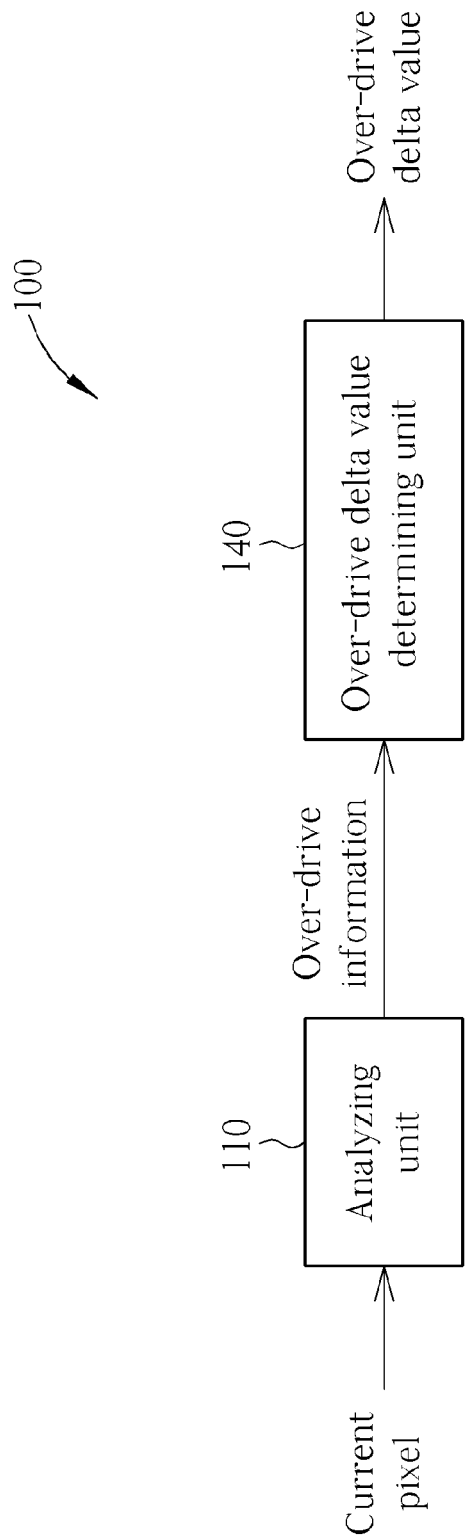
FIG. 1A is a block diagram of an over-drive controller applied to a display panel according to a first embodiment of the present disclosure.

Please refer to FIG. 1A. FIG. 1A is a block diagram of an over-drive controller applied to a display panel according to a first embodiment of the present disclosure. As shown in FIG. 1A, the over-drive controller 100 may include, but is not limited to, an analyzing unit 110 and an over-drive delta value determining unit 140. The analyzing unit 110 is arranged for analyzing information of a current pixel in order to generate an over-drive information. The over-drive delta value determining unit is coupled to the analyzing unit 110, and is arranged for determining an over-drive delta value according to the over-drive information. What calls for special attention is that: the over-drive information may comprise a position information or a field information of the current pixel. In other words, the over-drive delta value determining unit 140 may determine the over-drive delta value according to the position information of the field information of the current pixel. For example, the position information can be obtained by reference to the coordinate values (x,y) of the current pixel, and the field information can be obtained by detecting a field pulse.

Figure 1B:
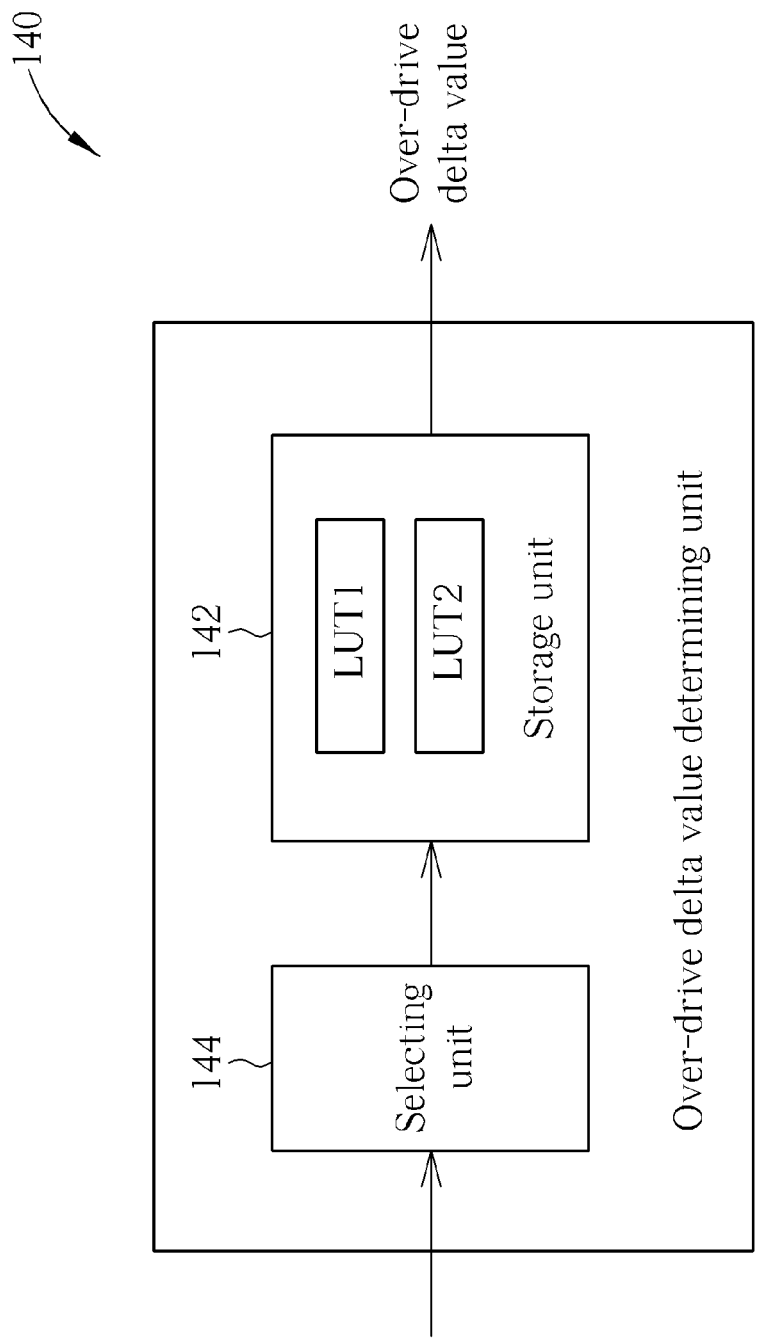
FIG. 1B is a block diagram of an over-drive delta value determining unit according to an embodiment of the present disclosure.

Please refer to FIG. 1B. FIG. 1B is a block diagram of an over-drive delta value determining unit 140 according to an embodiment of the present disclosure. As shown in FIG. 1B, the over-drive delta value determining unit 140 may include a storage unit 142 and a selecting unit 144. The storage unit 142 is arranged for storing a first over-drive delta value table LUT1 and a second over-drive delta value table LUT2. The selecting unit 144 is arranged for selecting the first over-drive delta value table LUT1 or the second over-drive delta value table LUT2 to generate the over-drive delta value according to the over-drive information.

In the following descriptions, several embodiments are cited for illustrating how the selecting unit 144 selects different over-drive delta value tables according to the position information of the over-drive information.

Figure 2:
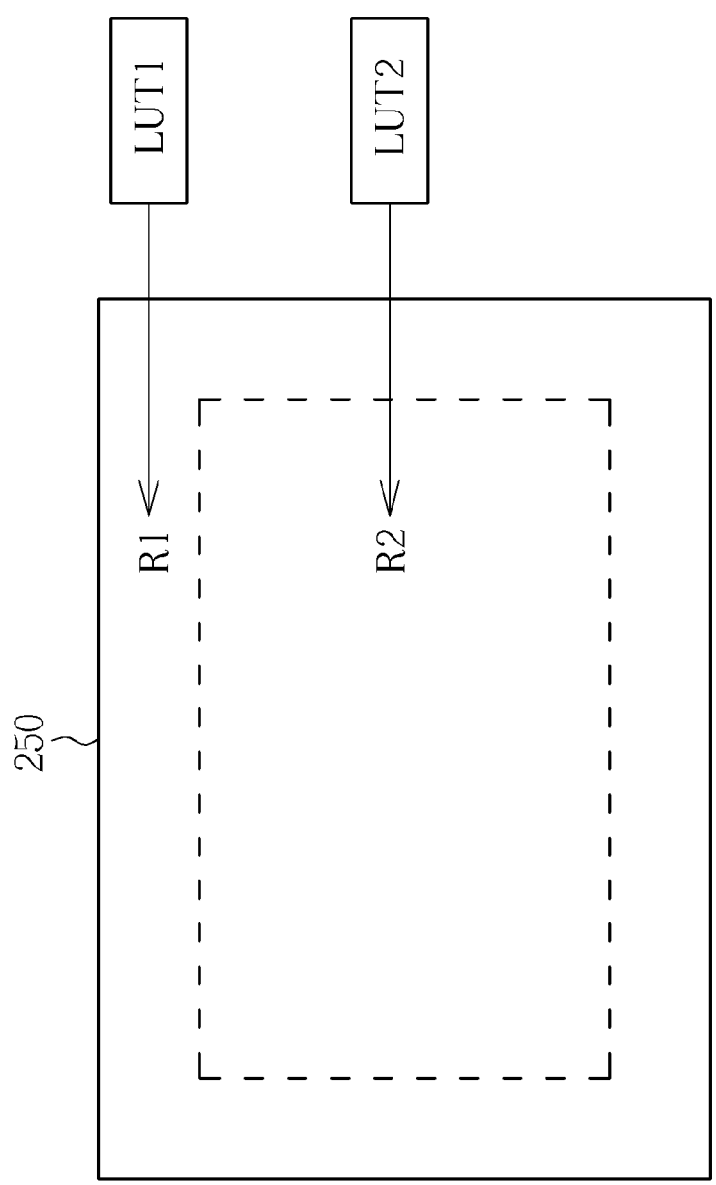
FIG. 2 is a diagram illustrating how to select different over-drive delta value tables according to the position information according to an embodiment of the present disclosure.

Please refer to FIG. 2. FIG. 2 is a diagram illustrating how to select different over-drive delta value tables according to the position information of the pixels according to an embodiment of the present disclosure. As shown in FIG. 2, a display panel 250 may include a first panel block R1 and a second panel block R2, wherein the first panel block R1 is located in an outer region of the display panel, and the second panel block R2 is located in a center region of the display panel 250. In this embodiment, the first over-drive delta value table LUT1 corresponds to the first panel block R1, and the second over-drive delta value table LUT2 corresponds to the second panel block R2; and thus the selecting unit 144 is arranged for selecting one of the first over-drive delta value table LUT1 and the second over-drive delta value table LUT2 according to the position information of the current pixel. For example, if the current pixel is located in the outer region R1, the selecting unit 144 then selects the first over-drive delta value table LUT1 to determine the over-drive delta value; and so on. Since a user mostly focuses on the second panel block R2 located in the center region with a horizontal viewing angle and pays less attention to the first panel block R1 located in the outer region with a skewed viewing angle when the user is viewing the display panel 250, two different over-drive delta value tables are adopted for the center region and the outer region of the display panel 250 in this embodiment.

Figure 3:
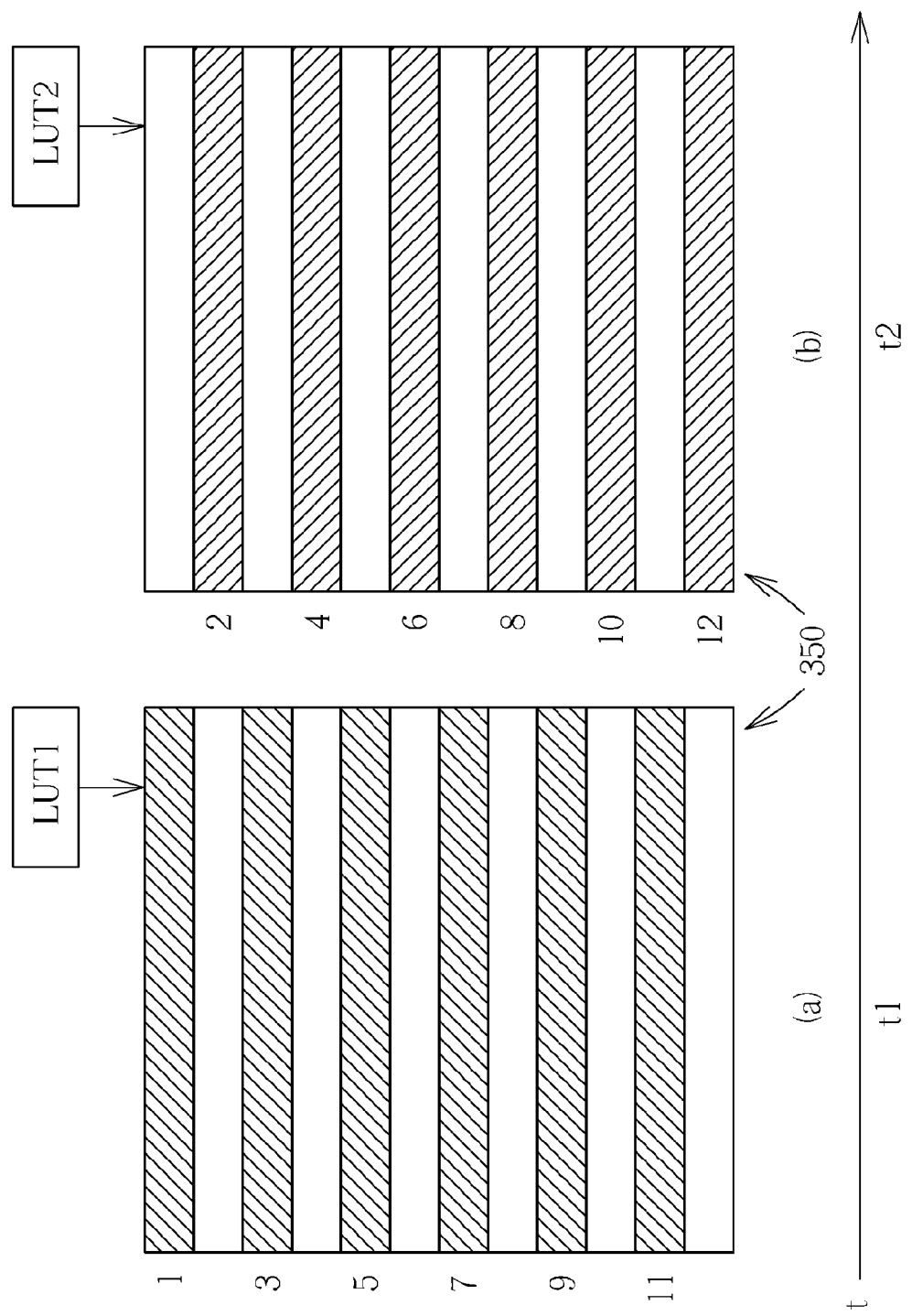
FIG. 3 is a diagram illustrating how to select different over-drive delta value tables according to the field information according to an embodiment of the present disclosure.

Please refer to FIG. 3. FIG. 3 is a diagram illustrating how to select different over-drive delta value tables according to the field information according to an embodiment of the present disclosure. As shown in FIG. 3, the left figure (a) is a diagram of odd fields of a frame, and the right figure (b) is a diagram of even fields of the frame. When the frame is displayed, the odd fields and the even fields of the frame are interlaced and shown on the display panel. During the period of displaying the odd fields, only the pixels located on the odd scanning lines can be displayed; during the period of displaying the even fields, only the pixels located on the even scanning lines can be displayed. The odd fields and the even fields are interlaced so as to form a full frame in human eyes. Please also refer to FIG. 1A and FIG. 1B. The first over-drive delta value table LUT1 corresponds to the odd fields, and the second over-drive delta value table LUT2 corresponds to the even fields. The analyzing unit 110 may analyze the information of the current pixel, by detecting a level of a field pulse, so as to determine whether the current pixel is located in the odd fields or the even fields, and accordingly generate the over-drive information. The selecting unit 144 may select the first over-drive delta value table LUT1 or the second over-drive delta value table LUT2 in order to determine the over-drive delta value according to the over-drive information. Since the 3D display signal is divided into the odd fields and the even fields, different demands are required for the over-drive delta values. In addition, if the 3D display signal has a high frame rate (such as, 120 MHz or 240 MHz), it's more important to adopt different over-drive delta values for the odd fields and the even fields in order to achieve a faster and more accurate response time compensation.

Figure 4:
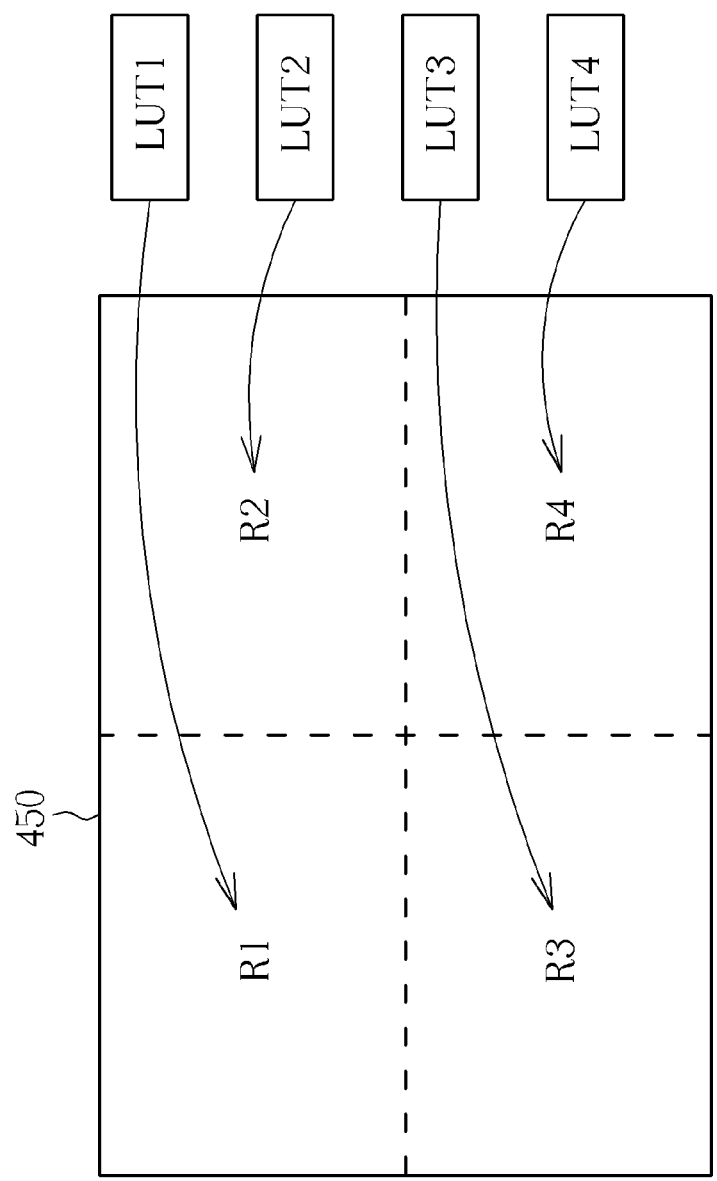
FIG. 4 is a diagram illustrating how to select different over-drive delta value tables according to the position information according to another embodiment of the present disclosure.

Please refer to FIG. 4. FIG. 4 is a diagram illustrating how to select different over-drive delta value tables according to the position information according to another embodiment of the present disclosure. As shown in FIG. 4, a display panel 450 is divided into a first panel block R1, a second panel block R2, a third panel block R3, and a fourth panel block R4, wherein the first panel block R1 is located at a upper left region of the display panel 450, the second panel block R2 is located at a upper right region of the display panel 450, the third panel block R3 is located at a lower left region of the display panel 450, and the fourth panel block R4 is located at a lower right region of the display panel 450. Please also refer to FIG. 1B. In this embodiment, the storage unit 142 is further arranged for storing a third over-drive delta value table LUT3 and a fourth over-drive delta value table LUT4 (not shown), wherein the first over-drive delta value table LUT1, the second over-drive delta value table LUT2, the third over-drive delta value table LUT3, and the fourth over-drive delta value table LUT4 respectively correspond to the upper left region R1, the upper right region R2, the lower left region R3, and the lower right region R4 of the display panel 450. In this embodiment, the selecting unit 144 may select the corresponding over-drive delta value table according to the position information of the current pixel. For example, if the position information obtained from the analyzing unit is indicative of the upper left region R1, the selecting unit 144 then selects the first over-drive delta value table LUT1 to determine the over-drive delta value; and so on. During the process of manufacturing the panel, closer regions affected by the surrounding environment are similar to each other, and thus closer regions of the panel have consistent panel features. In the light of such process characteristic, four different over-drive delta value tables are adopted in the upper left region R1, the upper right region R2, the lower left region R3, and the lower right region R4 of the display panel 450 in this embodiment.

Please note that: the number of the panel blocks should not be considered to be limitations of the present disclosure. Any concept of respectively providing different over-drive delta value tables according to different panel blocks of the display panel without departing the spirit of the present disclosure should also belong to the scope of the present disclosure.

Figure 5:
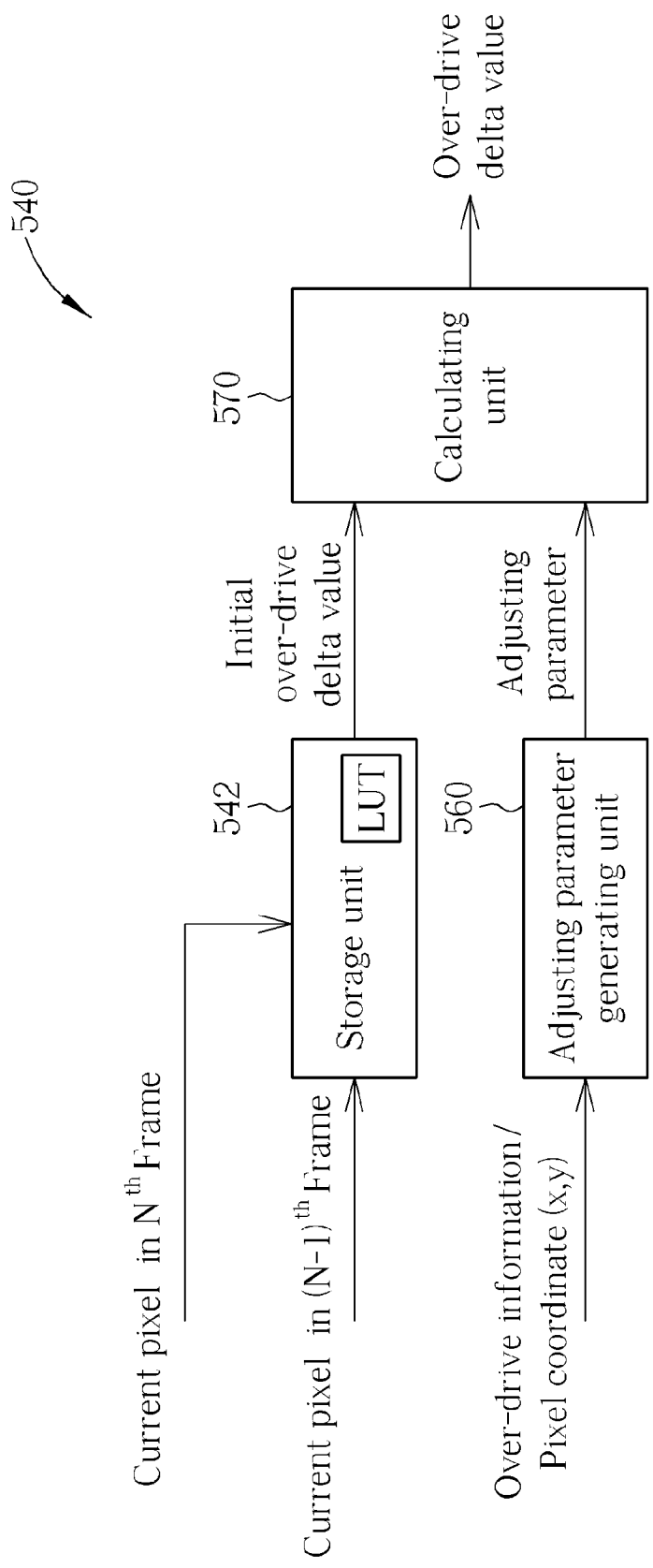
FIG. 5 is a block diagram of an over-drive delta value determining unit according to another embodiment of the present disclosure.

Please refer to FIG. 5. FIG. 5 is a block diagram of an over-drive delta value determining unit according to another embodiment of the present disclosure. As shown in FIG. 5, an over-drive delta value determining unit 540 may include, but is not limited to, a storage unit 542, an adjusting parameter generating unit 560, and a calculating unit 570. The storage unit 542 is arranged for storing an over-drive delta value table for providing an initial over-drive delta value. The adjusting parameter generating unit 560 is arranged for generating a plurality of adjusting parameters according to the over-drive information. In one embodiment, the plurality of adjusting parameters may comprise an offset value, a gain value, and a clamping value. Please also refer to FIG. 1A. The over-drive information, provided by the analyzing unit 110, may include a coordinate position (x, y) of the current pixel. Furthermore, the calculating unit 570 is coupled to the adjusting parameter generating unit 560 and the storage unit 542, and is arranged for generating the over-drive delta value according to the plurality of adjusting parameters and the initial over-drive delta value to which the current pixel corresponds. For example, the calculating unit 570 may determine the over-drive delta value according to the following equation:

$$UV = \text{Clamp}(A \times I + B) \tag{1}$$

Herein UV represents the over-drive delta value, I represents the over-drive delta value, A represents the gain value, B represents the offset value, and Clamp represents the clamping value For example, in this embodiment, the storage unit 542 may store an over-drive delta value table LUT. Herein the over-drive delta value table LUT can be a look-up table, which can find out a corresponding over-drive delta value (e.g., 20) in the over-drive delta value table LUT according to the pixel value of the current pixel in a current frame (e.g., $N^{th}$ frame) and the pixel value of the current pixel in a previous frame (e.g., $(N-1)^{th}$ frame). Assume that the coordinate position of the current value is (3, 2). The adjusting parameter generating unit 560 may generate a offset value (e.g., 5), a gain value (e.g., 1.05), and a clamping value (e.g., 0 or 255) according to the coordinate position (3, 2) of the current pixel. After that, the calculating unit 570 may determine the over-drive delta value to be 26 (26=1.05×20+5). After that, the over-drive delta value (e.g., 26) and the pixel value of the current pixel in the current frame are added together so as to obtain the over-drive value of the current pixel (not shown).

Figure 6:
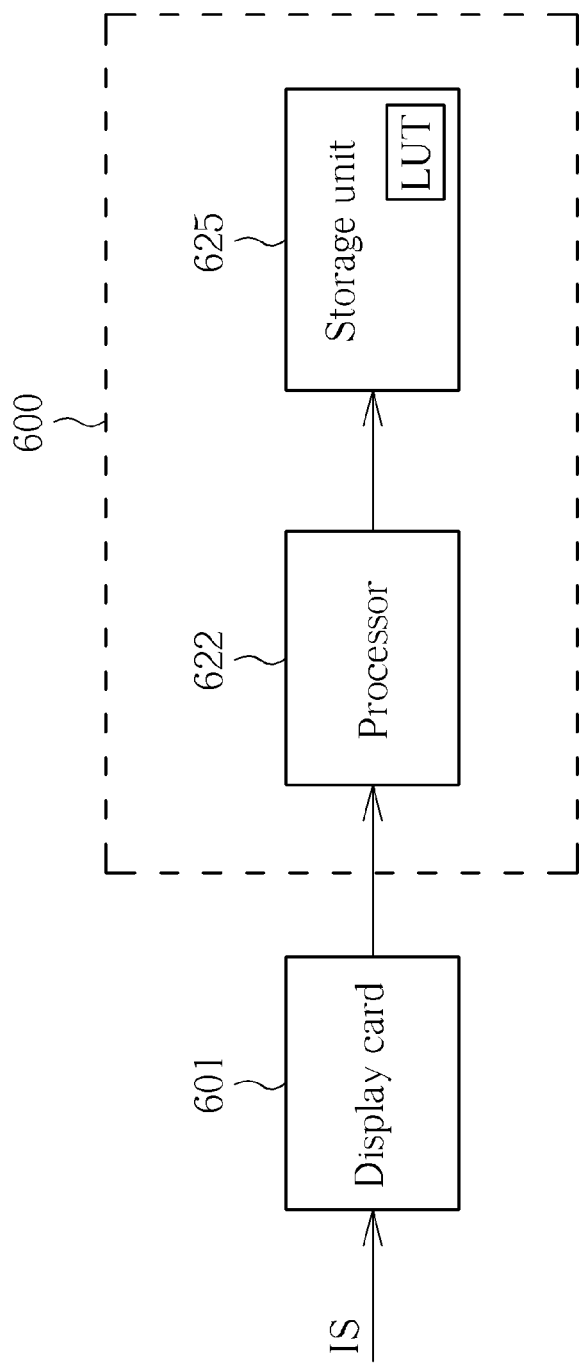
FIG. 6 is a block diagram of an over-drive controller applied to a display panel according to a second embodiment of the present disclosure.

Please refer to FIG. 6. FIG. 6 is a block diagram of an over-drive controller applied to a display panel according to a second embodiment of the present disclosure. As shown in FIG. 6, the over-drive controller 600 may include, but is not limited to, a processor 622 and a storage unit 625. The processor 622 can be implemented by a micro controller (MCU). The storage unit 625 is arranged for storing an over-drive delta value table LUT. In this embodiment, the processor 622 is arranged for modifying the over-drive delta value table according to a command of an image signal IS so as to update the over-drive delta value table LUT. Perfectly, the over-drive delta value table LUT can be modified during a vertical blanking period of the image signal IS. The image source, such as a display card, can generate the image signal IS according to a software command (such as, a game software). For example, when a scene of a game is turned into the room from the outside, the game software must know the frame will be quickly turned dark. For this reason, a command can be added into the image signal IS for modifying the over-drive delta value table via the display card 601. Perfectly, the time for lighting up the panel can be detected by the display card 601, such that the over-drive delta value can be updated, under different cooler states or warm states, during a vertical blanking period of the image signal IS via various protocols. The image signal IS and the command of the image signal IS can be transmitted to the over-drive controller 600 via a variety of existing protocols, such as a display data channel (DDC), an I2C bus, or an auxiliary input channel. After that, the processor 622 may modify the over-drive delta value table LUT according to the command of the image signal IS.

Figure 7:
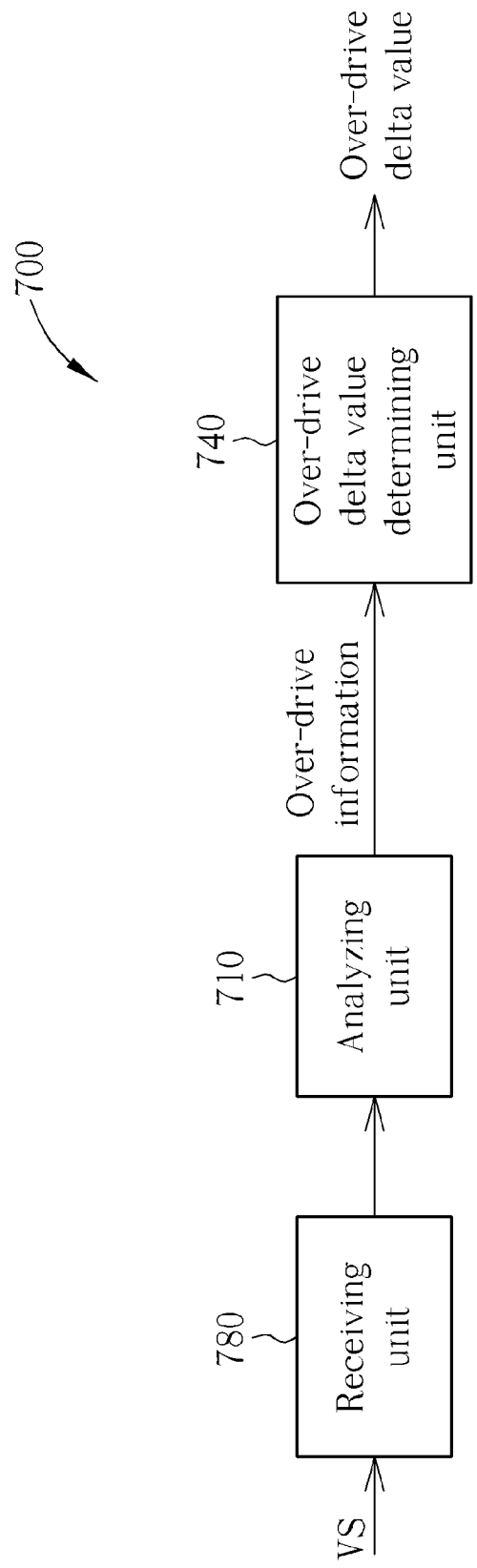
FIG. 7 is a block diagram of an over-drive controller applied to a display panel according to a third embodiment of the present disclosure.

Please refer to FIG. 7. FIG. 7 is a block diagram of an over-drive controller applied to a display panel according to a third embodiment of the present disclosure. As shown in FIG. 7, the over-drive controller 700 may include, but is not limited to, a receiving unit 780, an analyzing unit 710, and an over-drive delta value determining unit 740. The receiving unit 780 is arranged for receiving a visual angle signal VS. The analyzing unit 710 is arranged for analyzing the visual signal VS in order to generate an over-drive information. The over-drive delta value determining unit 740 is coupled to the analyzing unit 710, and is arranged for determining an over-drive delta value according to the over-drive information, wherein the visual angle signal VS is related to a viewing location where a user is viewing the display panel. Please note that: the over-drive delta value determining unit 740 can be implemented by the over-drive delta value determining unit 140 shown in FIG. 1B. Perfectly, the over-drive delta value can be determined by combining the calculating process shown in FIG. 5, but this in no way should be considered as a limitation of the present disclosure.

Figure 8:
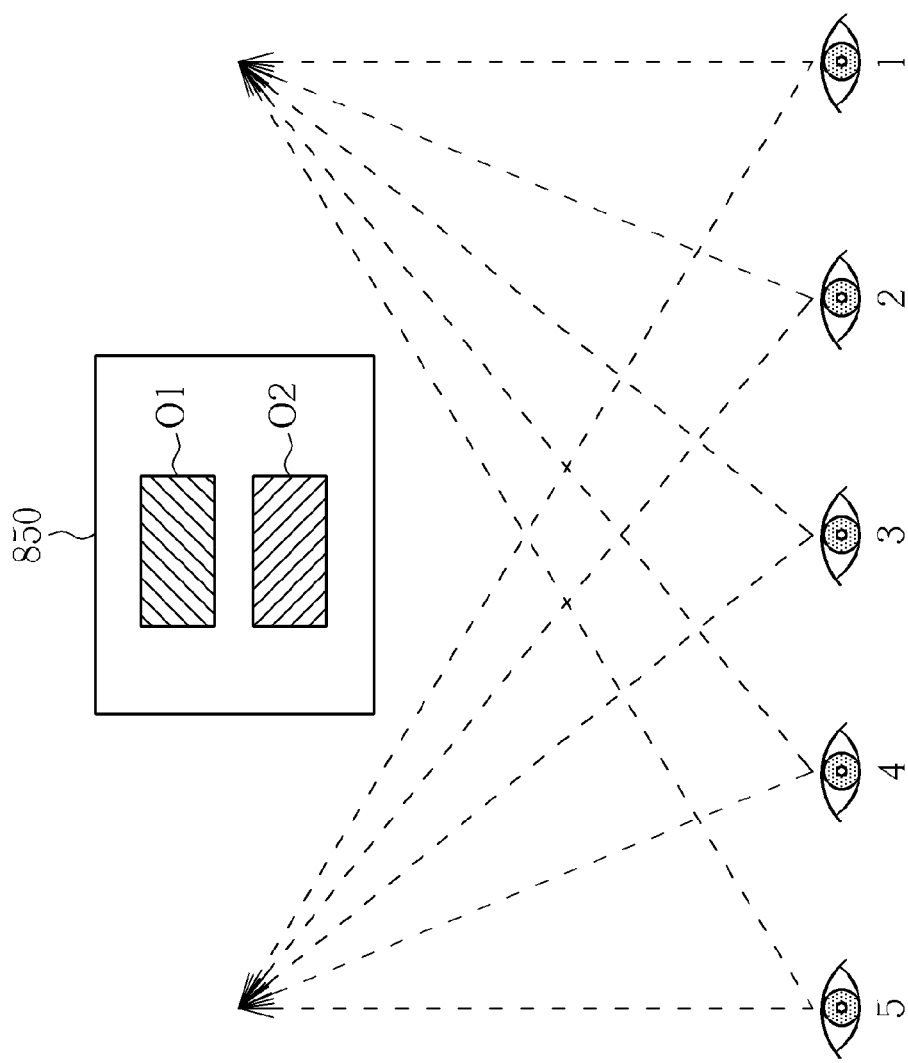
FIG. 8 is a diagram illustrating how the over-drive delta value determining unit selects the over-drive delta value table by reference to different visual angle signals according to an embodiment of the present disclosure.

For example, please refer to FIG. 8. FIG. 8 is a diagram illustrating how the over-drive delta value determining unit selects the over-drive delta value table by reference to different visual angle signals according to an embodiment of the present disclosure. As shown in FIG. 8, a display panel 850 can be implemented by a 3D display panel. When two objects O1 and O2 are displayed in the 3D frame, different visual effects will be generated if the user is viewing the display panel at different viewing locations 1~5. Please also refer to FIG. 1B. In this embodiment, the storage unit 142 may store the first over-drive delta value table LUT1 and the second over-drive delta value table LUT2. After that, the receiving unit 780 may receive the visual angle signal VS from a gyro sensor or a 3D accelerometer sensor of 3D glasses. Be noted that: the visual angle signal VS is related to the viewing location where the user is viewing the display panel, such as the location of human eyes as well as the relative relationship between this location and the display panel. The selecting unit 144 may select one of the first over-drive delta value table LUT1 and the second over-drive delta value table LUT2 according to the over-drive information analyzed from the visual angle signal VS. Please note that: the abovementioned first over-drive delta value table LUT1 and the second over-drive delta value table LUT2 are presented merely to illustrate practicable designs of the present disclosure, and should be considered to be limitations of the scope of the present disclosure. In other embodiments, the storage unit 142 may store five over-drive delta value tables. Therefore, the selecting unit 144 may apply five over-drive delta value tables based on the five locations 1~5. In another embodiment of the present disclosure, the visual angle at the locations 1 and 2 can share the same over-drive delta value table, the visual angle at the location 3 can use another over-drive delta value table, and the visual angle at the locations 4 and 5 can share still another over-drive delta value table, and thus only three over-drive delta value tables are required.

The abovementioned embodiments are presented merely to illustrate practicable designs of the present invention, and in no way should be considered to be limitations of the scope of the present invention. Those skilled in the art should appreciate that various modifications of the over-drive controllers 100, 600, and 700 and the over-drive delta value determining units 140, 540, and 740 shown in FIG. 1-FIG. 8 may be made without departing from the spirit of the present invention, and they can be arranged or combined randomly into a plurality of new varied embodiments, which also belongs to the scope of the present disclosure.

Figure 9:
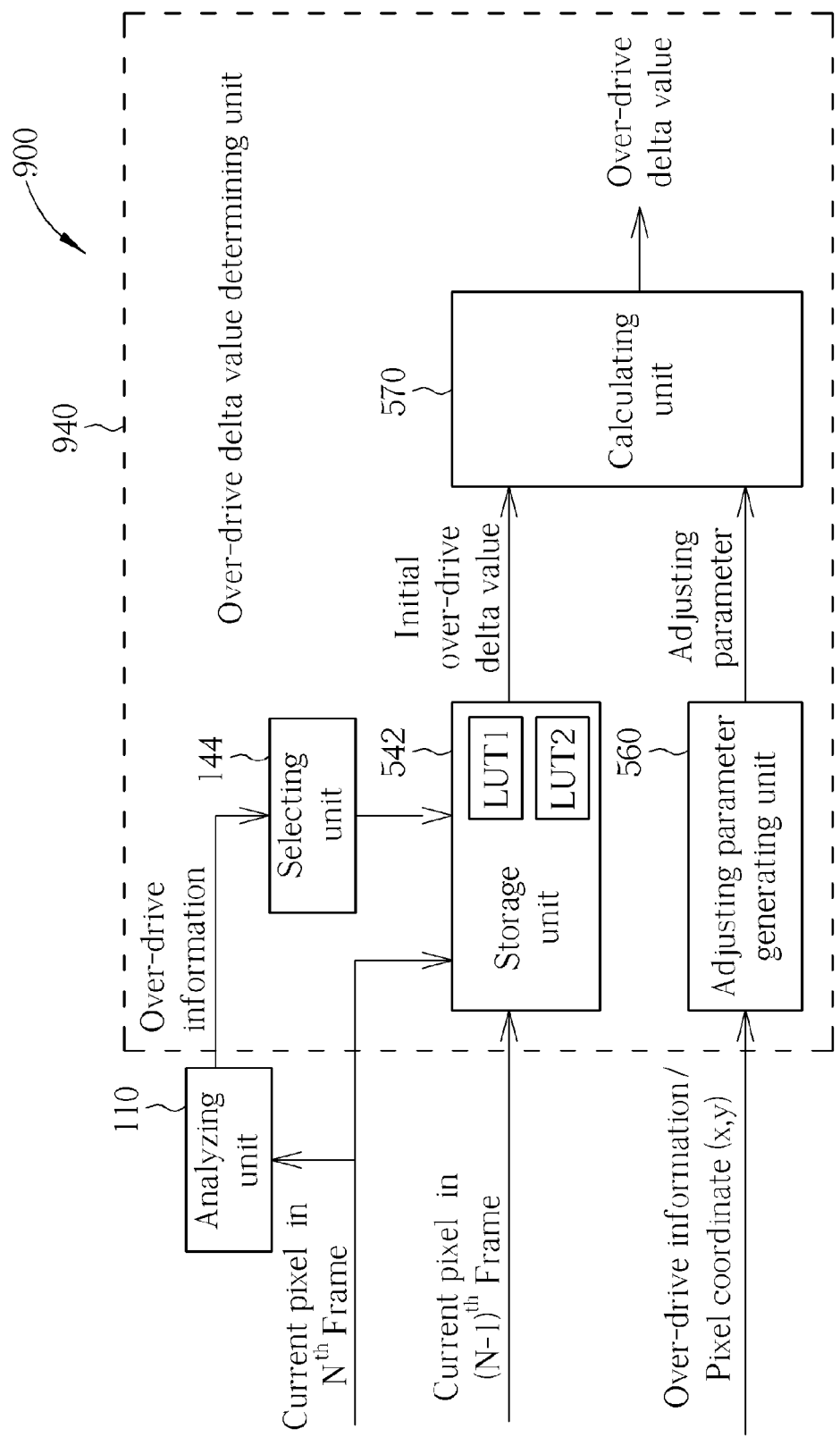
FIG. 9 is a block diagram of an over-drive controller applied to a display panel according to a fourth embodiment of the present disclosure.
Figure 10A:
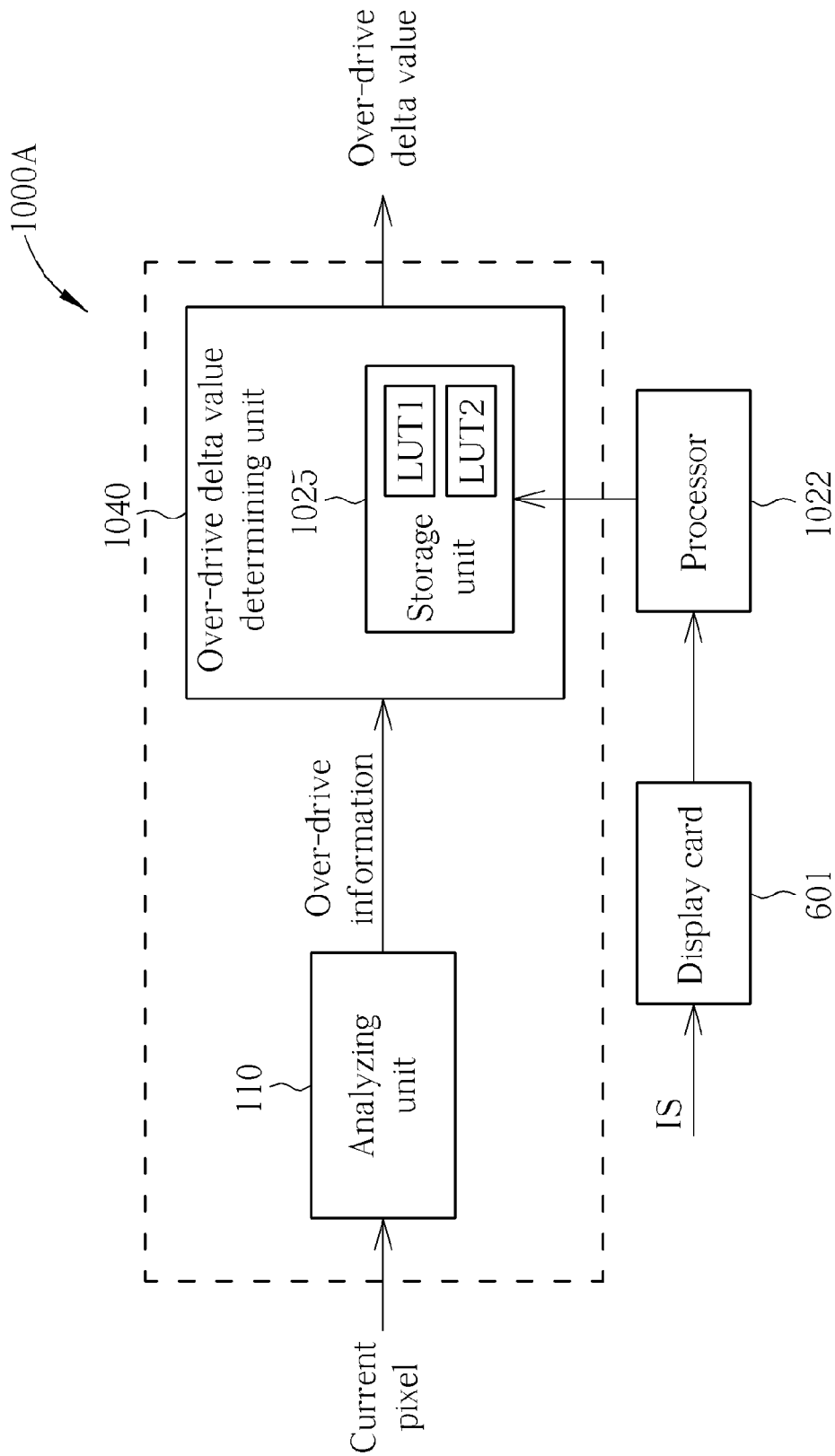
FIG. 10A is a block diagram of an over-drive controller applied to a display panel according to a fifth embodiment of the present disclosure.
Figure 10B:
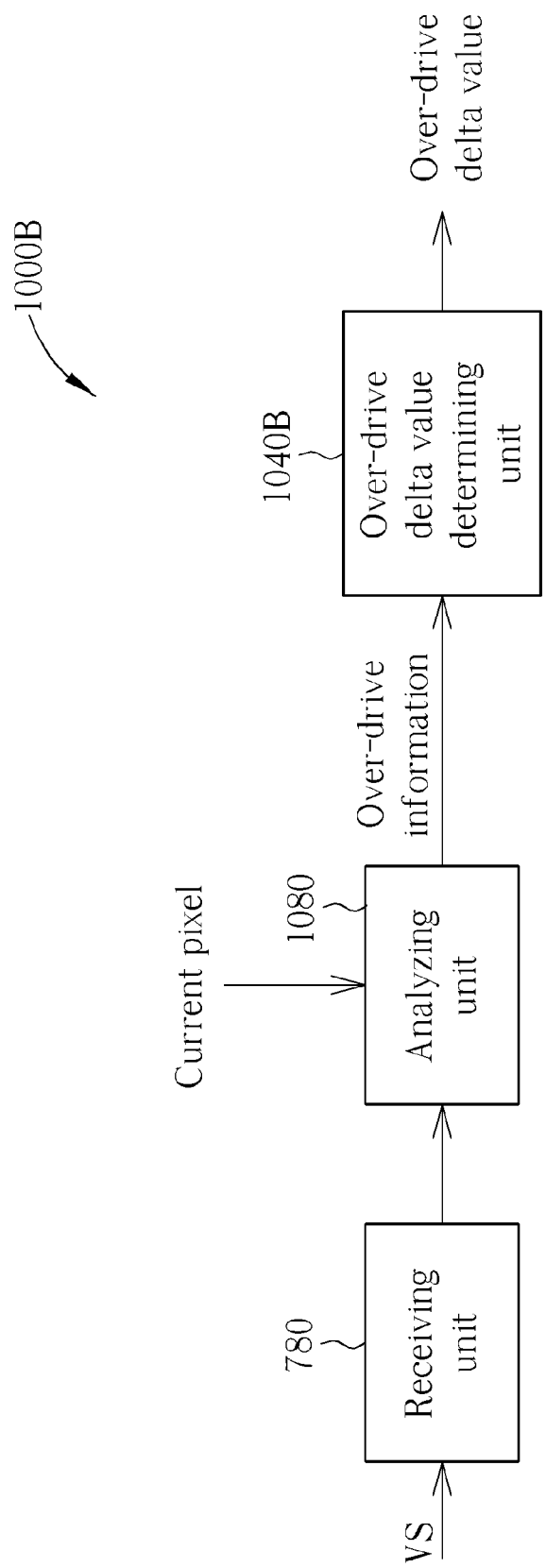
FIG. 10B is a block diagram of an over-drive controller applied to a display panel according to a sixth embodiment of the present disclosure.

For example, please refer to FIG. 9, FIG. 10A together with FIG. 10B. FIG. 9 is a block diagram of an over-drive controller applied to a display panel according to a fourth embodiment of the present disclosure. The over-drive controller 900 shown in FIG. 9 contains both the selecting architecture for selecting the over-drive delta value tables shown in FIG. 1B and the calculating architecture shown in FIG. 5, wherein the over-drive information, outputted by the analyzing unit 110, can be provided to the selecting unit 144 and the adjusting parameter generating unit 560. That is to say, with regard to each panel block, the over-drive delta value corresponding to each pixel of each panel block can be dynamically adjusted by the over-drive controller 900. Furthermore, by reference to the paragraphs related to the over-drive controller 100 and the over-drive controller 500, those skilled in the art can readily understand operations of the over-drive controller 900, and further description is omitted here for brevity.

Similarly, FIG. 10A is a block diagram of an over-drive controller applied to a display panel according to a fifth embodiment of the present disclosure. The architecture of the over-drive controller 1000A shown in FIG. 10A is similar to that of the over-drive controller 100, and the difference between them is that: the over-drive controller 1000A further includes the technical features of the over-drive controller 600 shown in FIG. 6. That is to say, the over-drive delta value tables corresponding to each block can be dynamically modified by the over-drive controller 1000A. Furthermore, by reference to the paragraphs related to the over-drive controller 100 and the over-drive controller 600, those skilled in the art can readily understand operations of the over-drive controller 1000A, and further description is omitted here for brevity.

FIG. 10B is a block diagram of an over-drive controller applied to a display panel according to a sixth embodiment of the present disclosure. The architecture of the over-drive controller 1000B shown in FIG. 10B is similar to that of the over-drive controller 100 shown in FIG. 1, and the difference between them is that: the over-drive controller 1000B further includes the technical features of the over-drive controller 700 shown in FIG. 7. That is to say, the analyzing unit 1080 may receive the information of the current pixel and receive the visual angle signal VS via the receiving unit 780. Therefore, with regard to each panel block, one over-drive delta value table can be dynamically selected, by the over-drive controller 1000B, from the plurality of over-drive delta value tables according to the location of human eyes, the location of the viewing angle, the position of the current pixel or the field information.

Figure 11:
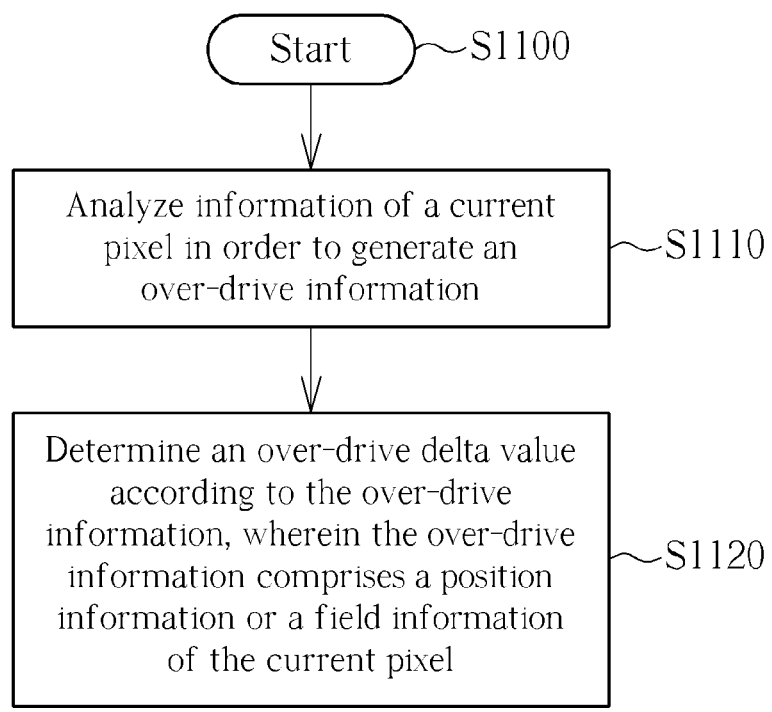
FIG. 11 is a flowchart illustrating a method for over-drive control applied to a display panel according to a first exemplary embodiment of the present disclosure.

Please refer to FIG. 11. FIG. 11 is a flowchart illustrating a method for over-drive control applied to a display panel according to a first exemplary embodiment of the present disclosure. Please note that the following steps are not limited to be performed according to the exact sequence shown in FIG. 11 if a roughly identical result can be obtained. The method may include, but is not limited to, the following steps:

Step S1100: Start.

Step S1110: Analyze information of a current pixel in order to generate an over-drive information.

Step S1120: Determine an over-drive delta value according to the over-drive information, wherein the over-drive information comprises a position information or a field information of the current pixel.

Those skilled in the art can readily understand how each step shown in FIG. 11 operates by referring to the paragraphs related to FIG. 1A, and further description is omitted here for brevity.

Figure 12:
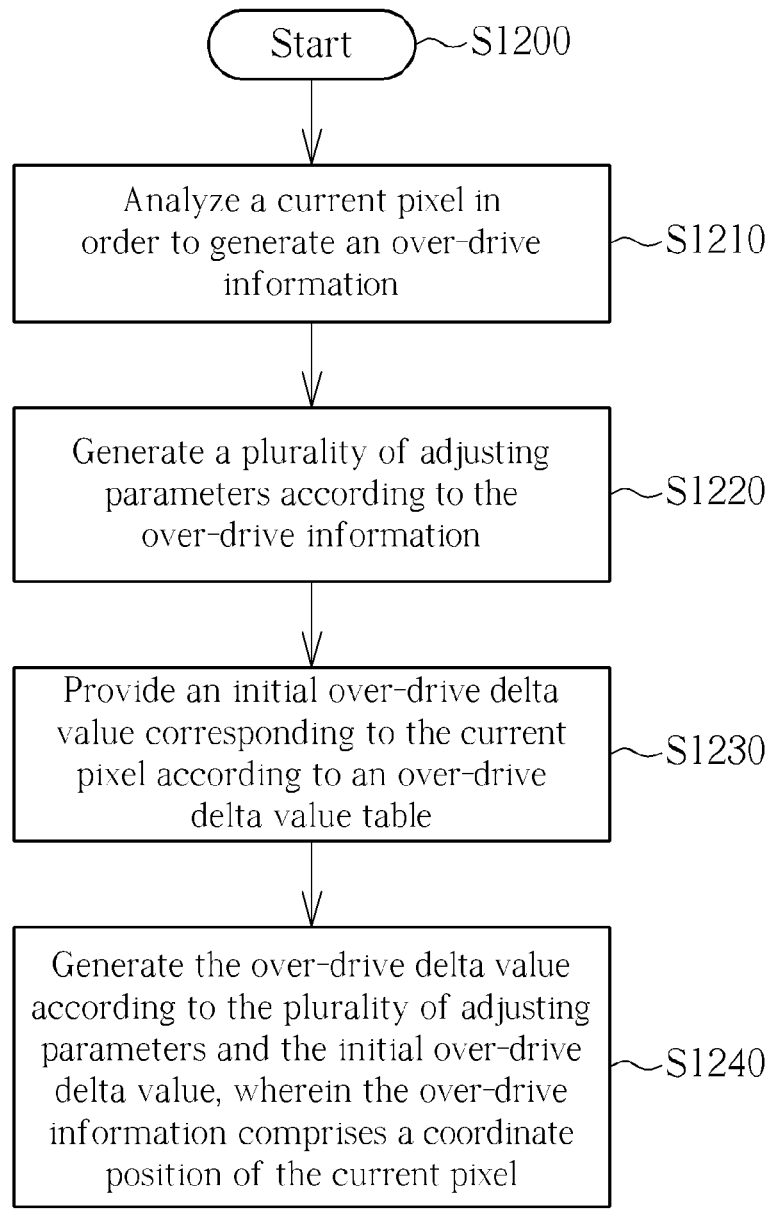
FIG. 12 is a flowchart illustrating a method for over-drive control applied to a display panel according to a second exemplary embodiment of the present disclosure.

Please refer to FIG. 12. FIG. 12 is a flowchart illustrating a method for over-drive control applied to a display panel according to a second exemplary embodiment of the present disclosure. Please note that the following steps are not limited to be performed according to the exact sequence shown in FIG. 12 if a roughly identical result can be obtained. The method may include, but is not limited to, the following steps:

Step S1200: Start.

Step S1210: Analyze a current pixel in order to generate an over-drive information.

Step S1220: Generate a plurality of adjusting parameters according to the over-drive information.

Step S1230: Provide an initial over-drive delta value corresponding to the current pixel according to an over-drive delta value table.

Step S1240: Generate the over-drive delta value according to the plurality of adjusting parameters and the initial over-drive delta value, wherein the over-drive information comprises a coordinate position of the current pixel.

Those skilled in the art can readily understand how each step shown in FIG. 12 operates by referring to the paragraphs related to FIG. 5, and further description is omitted here for brevity.

Figure 13:
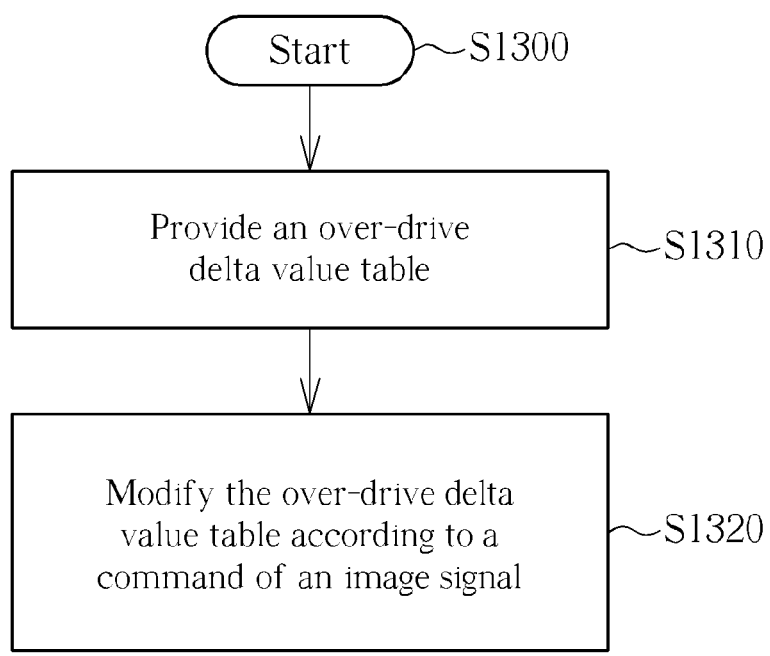
FIG. 13 is a flowchart illustrating a method for over-drive control applied to a display panel according to a third exemplary embodiment of the present disclosure.

Please refer to FIG. 13. FIG. 13 is a flowchart illustrating a method for over-drive control applied to a display panel according to a third exemplary embodiment of the present disclosure. Please note that the following steps are not limited to be performed according to the exact sequence shown in FIG. 13 if a roughly identical result can be obtained. The method may include, but is not limited to, the following steps:

Step S1300: Start.

Step S1310: Provide an over-drive delta value table.

Step S1320: Modify the over-drive delta value table according to a command of an image signal.

Those skilled in the art can readily understand how each step shown in FIG. 13 operates by referring to the paragraphs related to FIG. 6, and further description is omitted here for brevity.

Figure 14:
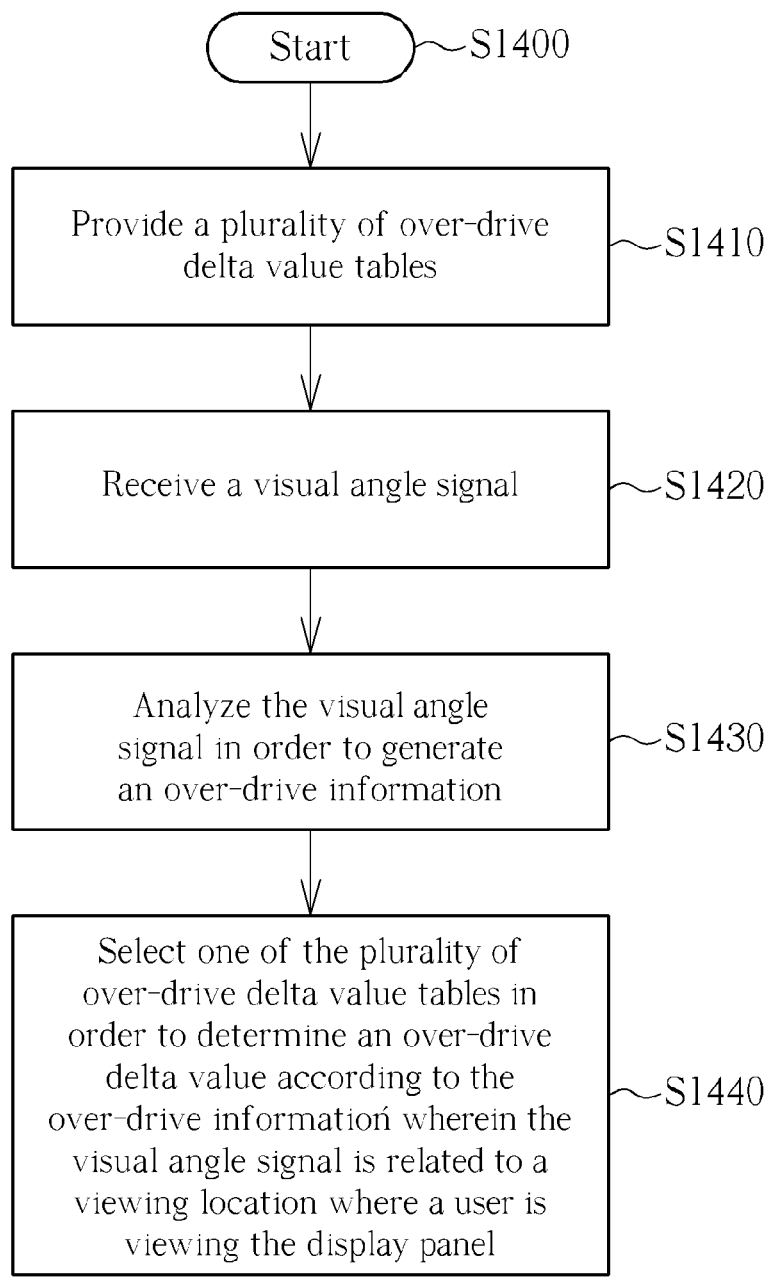
FIG. 14 is a flowchart illustrating a method for over-drive control applied to a display panel according to a fourth exemplary embodiment of the present disclosure.

Please refer to FIG. 14. FIG. 14 is a flowchart illustrating a method for over-drive control applied to a display panel according to a fourth exemplary embodiment of the present disclosure. Please note that the following steps are not limited to be performed according to the exact sequence shown in FIG. 14 if a roughly identical result can be obtained. The method may include, but is not limited to, the following steps:

Step S1400: Start.

Step S1410: Provide a plurality of over-drive delta value tables.

Step S1420: Receive a visual angle signal.

Step S1430: Analyze the visual angle signal in order to generate an over-drive information.

Step S1440: Select one of the plurality of over-drive delta value tables in order to determine an over-drive delta value according to the over-drive information; wherein the visual angle signal is related to a viewing location where a user is viewing the display panel.

Those skilled in the art can readily understand how each step shown in FIG. 14 operates by referring to the paragraphs related to FIG. 7 and FIG. 8, and further description is omitted here for brevity.

Please note that, the steps of the abovementioned flowcharts are merely practicable embodiments of the present disclosure, and in no way should be considered to be limitations of the scope of the present disclosure. These methods can include other intermediate steps or several steps can be merged into a single step without departing from the spirit of the present disclosure.

In summary, an over-drive controller for respectively providing a plurality of over-drive delta value tables according to properties of a plurality of panel blocks of a display panel and for dynamically adjusting the over-drive delta values and a related method for over-drive control are provided in the present disclosure. Therefore, the over-drive delta value can be determined in accordance with the position information or the field information of the current pixel. Furthermore, with regard to each panel block, their optimum over-drive delta value tables can be dynamically selected according to the location of human eyes and the location of the viewing angle. In addition, with regard to each panel block, the over-drive delta value corresponding to the current pixel can be dynamically adjusted in order to meet all the requirements under different application conditions in the present disclosure.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An over-drive controller applied to a display panel, comprising:
   an analyzing unit, arranged for analyzing information of a current pixel in order to generate an over-drive information;
   an over-drive delta value determining unit, coupled to the analyzing unit, arranged for determining an over-drive delta value according to the over-drive information;
   wherein the over-drive information comprises a position information or a field information of the current pixel: and
   a receiving unit, arranged for receiving a visual angle signal and providing the visual angle signal to the analyzing unit;
   wherein the analyzing unit is further arranged for generating the over-drive information based on the visual angle signal, and providing the over-drive information to the over-drive delta value determining unit, the visual angle signal related to a viewing location where a user is viewing the display panel.

2. The over-drive controller according to claim 1, wherein the over-drive delta value determining unit comprises:
   a storage unit, arranged for storing a first over-drive delta value table and a second over-drive delta value table; and
   a selecting unit, arranged for selecting the first over-drive delta value table or the second over-drive delta value table to generate the over-drive delta value according to the over-drive information;
   wherein the first over-drive delta value table and the second over-drive delta value table respectively correspond to different visual angles.

3. An over-drive controller applied to a display panel, comprising:
   a receiving unit, arranged for receiving a visual angle signal;
   an analyzing unit, arranged for analyzing the visual angle signal in order to generate an over-drive information; and
   an over-drive delta value determining unit, coupled to the analyzing unit, arranged for determining an over-drive delta value according to the over-drive information;
   wherein the visual angle signal is related to a viewing location where a user is viewing the display panel.

4. The over-drive controller according to claim 3, wherein the over-drive delta value determining unit comprises:
   a storage unit, arranged for storing a first over-drive delta value table and a second over-drive delta value table; and
   a selecting unit, arranged for selecting the first over-drive delta value table or the second over-drive delta value table to generate the over-drive delta value according to the over-drive information.

* * * * *